United States Patent
Clark

(10) Patent No.: US 7,856,637 B1
(45) Date of Patent: Dec. 21, 2010

(54) RUNTIME EMULATING STATIC THREAD LOCAL STORAGE OF PORTABLE EXECUTABLE SOFTWARE CODE

(75) Inventor: Jonathan Clark, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 1034 days.

(21) Appl. No.: 11/552,734

(22) Filed: Oct. 25, 2006

(51) Int. Cl.
  G06F 3/00     (2006.01)
  G06F 9/44     (2006.01)
  G06F 9/45     (2006.01)
  G06F 13/00    (2006.01)
(52) U.S. Cl. ...................... 719/318; 719/331
(58) Field of Classification Search ............ 719/318, 719/331
  See application file for complete search history.

(56) References Cited

U.S. PATENT DOCUMENTS

| | | | | |
|---|---|---|---|---|
| 5,946,486 A | * | 8/1999 | Pekowski | 717/128 |
| 5,974,470 A | * | 10/1999 | Hammond | 719/331 |
| 6,760,903 B1 | * | 7/2004 | Morshed et al. | 717/130 |
| 2006/0005085 A1 | * | 1/2006 | Zunino et al. | 714/47 |

OTHER PUBLICATIONS

Microsoft Corp, Microsoft Portable Executable and Common Object File Format Specification, Microsoft Corporation, Revision 6.0, Feb. 1999, pp. 1-77.*
Schwarz, Thread Local Storage—The C++ Way, The Code Project, Aug. 2004, pp. 1-9.*

* cited by examiner

*Primary Examiner*—Diem K Cao

(57) ABSTRACT

A Windows™ process loader is emulated for dynamic TLS data allocation during respective application runtime. A total required TLS data block size is initially calculated and corresponding data block duplicates are created preferably after initializing of the application. An event notification system such as a hooking system intercepts DLL loading and freeing activity as well as thread creation and exiting and provides event notifications for dynamic allocation of corresponding TLS data block duplicates.

19 Claims, 6 Drawing Sheets

RUNTIME EMULATING STATIC THREAD LOCAL STORAGE OF PORTABLE EXECUTABLE SOFTWARE CODE

CROSS REFERENCE

The present invention cross references the US application of the same inventor, Ser. No. 11/381,715 filed May 4, 2006 under the title "Chained Hook Function Serving Multiple Versions Of Identically Named Dynamically Loaded Libraries", which is hereby incorporated by reference.

FIELD OF INVENTION

The present invention relates to method and software code for emulating static thread local storage of portable executable software code within a Windows™ operating system during runtime of a software application that is related to the portable executable software code.

BACKGROUND OF INVENTION

Well known software code commonly contained in portable executable file format also known as PE file format, mainly includes information to be used by a well known Windows™ process loader. PE files are well known EXE or DLL files that are provided by the operating system and/or by an installed software application intended to run within the respective Windows™ operating system.

Upon initializing of a software application, the process loader commonly creates new processes in the operation system and uses the loaded PE image to determine various starting properties such as which memory addresses to initially allocate, how much stack space is required and the like as is well known in the art. The process loader consults also the PE image to determine what additional DLLs should be loaded before the process begins executing. These DLLs are commonly known as implicitly referenced DLLs.

DLL files may optionally specify what is known as Thread Local Storage Data Directory Element [TLS]. TLS instructs via the process loader the operating system to allocate and initialize a specific amount of data for each thread created while the related application is running. This is sometimes necessary so that individual threads can read and write data without interference from other threads. A thread is a well known part of a program that can execute independently of other program parts and eventually concurrently with other thread(s).

During runtime of the related application, the size of the initially allocated and initialized data cannot be changed since it would interfere with thread access. Hence, the Windows™ process loader processes only TLS information for implicitly referenced DLL files.

At the time this invention was made, there are a number of shortcomings that come with the process loader's automatic loading of implicitly referenced DLLs prior to application run. The process loader has limited facilities for programmatically determining where a DLL should be loaded from and which version should be used. The process loader does not provide facilities for loading DLLs from data streams, compressed archives, or application specific encrypted storage. The process loader significantly limits a streamlined application startup during which only immediately needed DLLs are loaded. Therefore, there exists a need for dynamically and programmatically loading DLLs during runtime of the respective application. The present invention addresses this need.

SUMMARY

The present invention emulates a Windows™ process loader for dynamic TLS data allocation during respective application runtime. This is accomplished in several steps. First, the total required size of all TLS data blocks is calculated for implicitly referenced DLLs and/or runtime to be loaded DLLs that contain a TLS directory. Next, a pre-initialized data block duplicate of the previously calculated size is created preferably after initializing execution of the respective application. Total TLS data block calculation and data block duplicate creation may be also provided at a time prior to application initialization, in case of which the data block duplicate may be stored prior to its use. While the application is running, an event notification system generates a number of event notifications associated with intercepted runtime DLL loading and/or intercepted runtime DLL freeing and/or runtime thread create calling and/or runtime thread exit calling made by and/or in association with the application. Upon receipt of a specific event notification, a previously created thread data block duplicate is allocated. The thread data block duplicate is allocated for a thread created by the intercepted runtime thread create call. Upon receipt of other types of event notifications, a thread local storage callback function associated with an intercepted runtime loaded DLL and/or an intercepted runtime freed DLL is executed. The event notification system may be based on a well known debugging system. The event notification system may also incorporate for runtime interception a hooking system such as one described in the cross referenced application.

DETAILED DESCRIPTION

Figure 1:
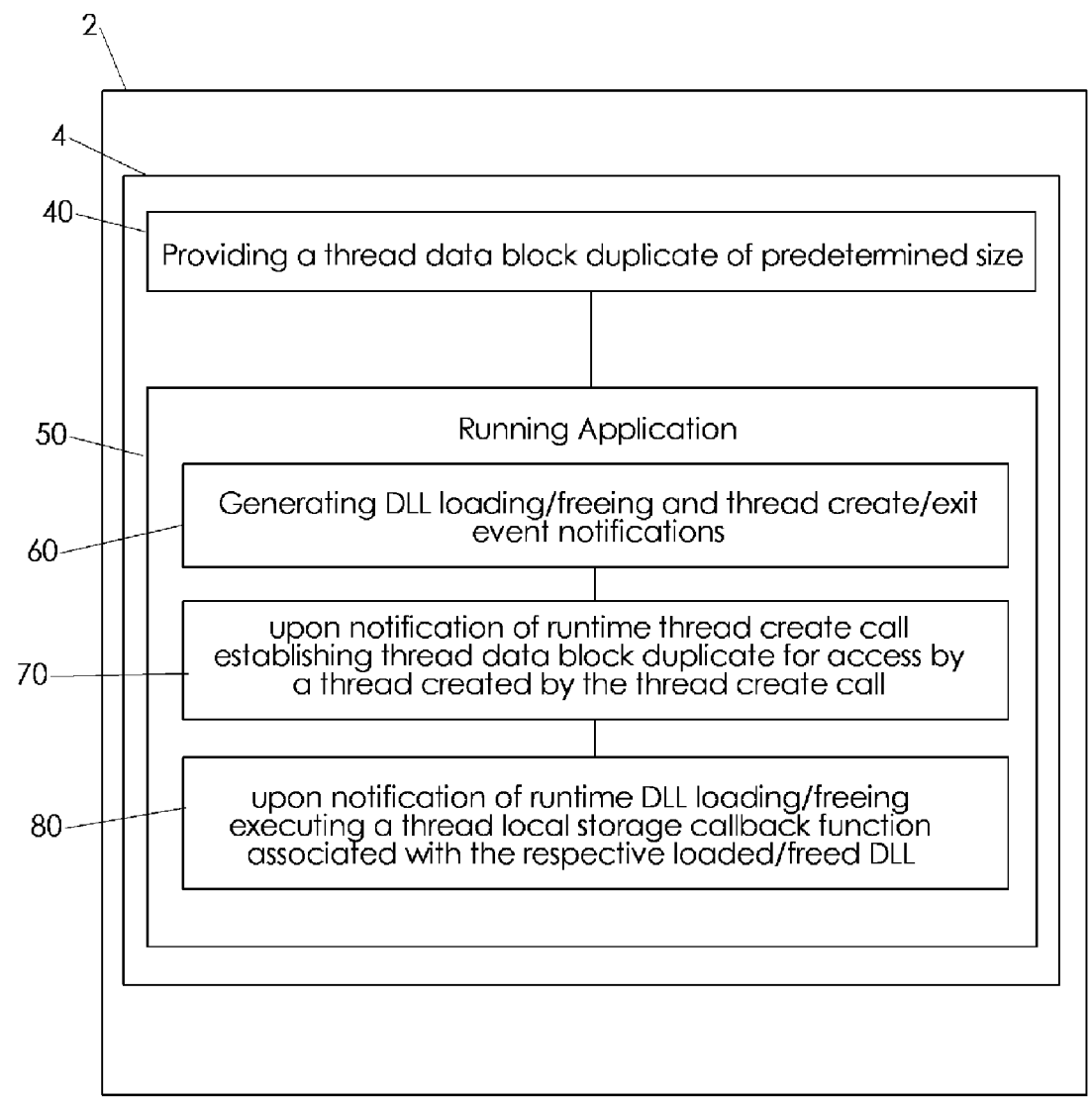
FIG. 1 is an overview block diagram of a first embodiment of the present invention.

Referring to FIG. 1 and according to a first embodiment of the invention, a method for runtime emulating a static thread local storage of a portable executable software code includes the step 40 of providing a thread data block duplicate computerized establish able within an isolated process memory area 4 within which the method of the present invention is practiced. The thread data block duplicate may be of predetermined size within the isolated process memory area 4 and may be provided for example by uploading it from well known computer storage memory. The isolated process memory area 4 may be provided by an operating system 2 such as Windows™.

The thread data block duplicate may be configured to provide one or more partitions while established within the isolated process memory area. Number and size of the individual partitions may be predetermined by recursively scanning a portable executable image for static DLL imports which contain IMAGE_DIRECTORY_ENTRY_TLS Data directory elements. In case the provided thread data block duplicate is not partitioned at begin of application running and/or application initialization, the provided thread data block duplicate may be initialized after the application has begun running. In a following step, it is iterated through a number of to be loaded DLLs noticed via the first event notification.

Following step 40 and as indicated by step 50 an application is initialized and running within the isolated process memory area 4. The application is related to the portable executable software code. While the application is running, an event notification system generates first, second, third and fourth event notifications as indicated by step 60. The event notification system may be a well known hooking system and/or debugger system. The hooking system may be any well known system but preferably one as described in the cross referenced application. The debugging system may be implemented using Windows Debugger API. The Windows Debugger API provides built in mechanisms for receiving notifications for DLL Loading, DLL Unloading, Thread Creation, and Thread removal.

The first event notification is associated with an intercepted runtime DLL loading. The second event notification is associated with an intercepted runtime DLL freeing. The third event notification is associated with an intercepted runtime thread create call. The fourth event notification is associated with an intercepted runtime thread exit call. The intercepted runtime DLL loading, DLL freeing, thread create call thread exit call are made by the application. First, second, third and fourth event notifications may occur in any succession.

As shown by step 70 and upon occurrence of the third event notification, the thread data block duplicate is established in the isolated process memory area 4 for access by a thread created by the intercepted runtime thread create call. As shown by step 80 and upon occurrence of the first event notification and/or the second event notification, a thread local storage callback function is executed. The thread local storage callback function is associated with one of a loaded DLL and a freed DLL. The loaded DLL is loaded during intercepted runtime DLL loading, and the freed DLL is freed during intercepted runtime DLL freeing.

Figure 5:
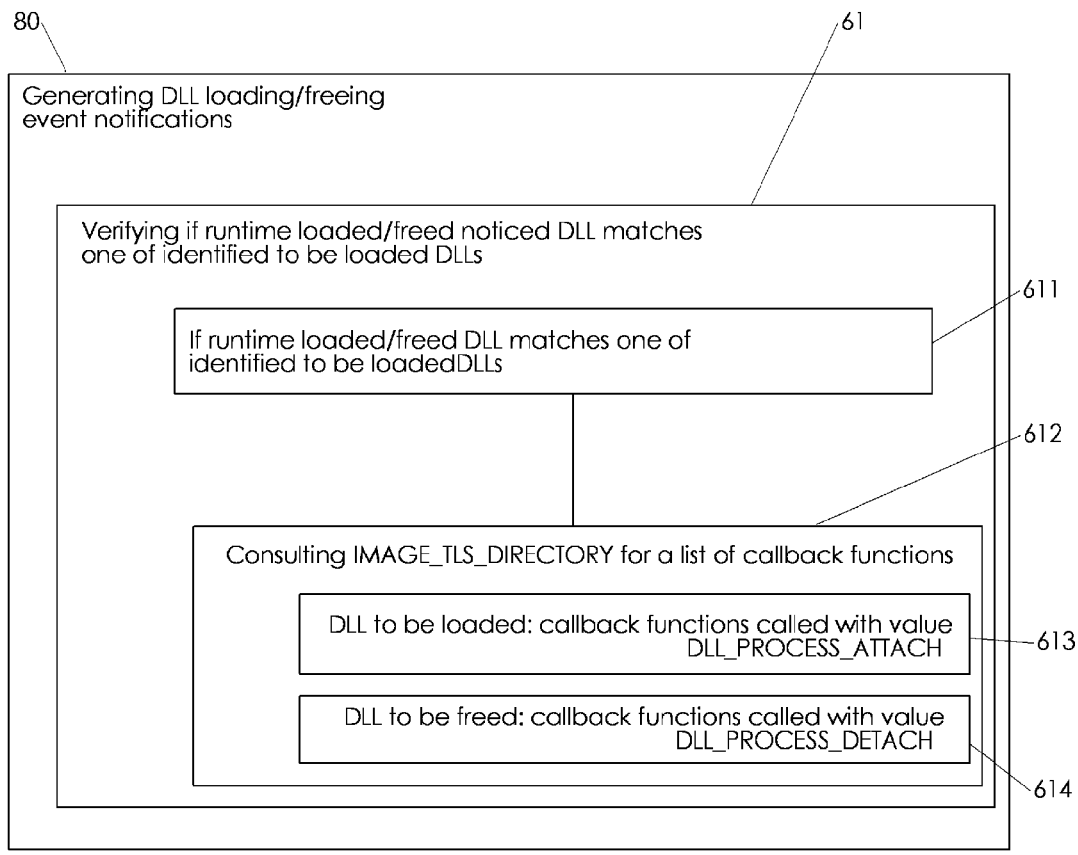
FIG. 5 is a detail block diagram of step 80 depicted in FIGS. 1 and 2.

Referring to FIG. 5 and once a DLL loaded by the application is noticed via the first event notification, it is verified according to step 61 if the noticed loaded DLL matches one of previously known runtime to be loaded DLLs. Runtime to be loaded DLLs may be previously known by examining a set of files associated with a specific application installation and scanning said files which exist in the portable executable file format and which also contain a IMAGE_DIRECTORY_ENTRY_TLS structure. In case a match is found and in case of a Windows™ operating system 2, according to step 612 a well known structure IMAGE_TLS_DIRECTORY is consulted for a list of thread local storage callback functions. In case of a runtime to be loaded DLL match, the callback function may be called with a well known value DLL_PROCESS_ATTACH as shown in step 613. In case of a runtime to be freed DLL match, the callback function may be called with a well known value DLL_PROCESS_DETTACH as shown in step 614.

Figure 2:
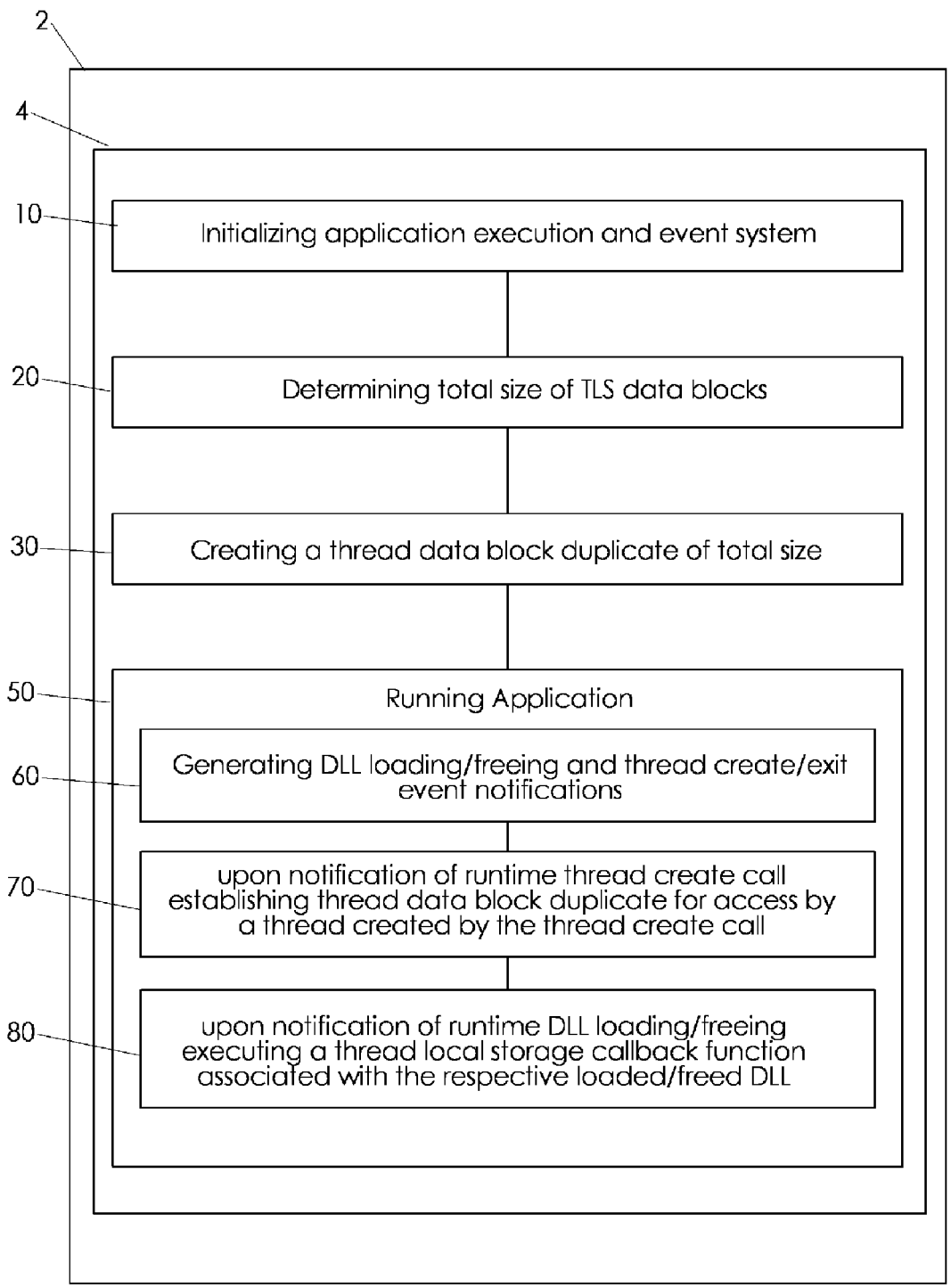
FIG. 2 is an overview block diagram of a second embodiment of the present invention.

Referring to FIG. 2 and according to a second embodiment of the invention, the thread data block duplicate is created as shown in step 30 following the initializing of application execution as illustrated in step 10. The total size of all relevant static thread local storage may be previously known via by examining a set of files associated with a specific application installation and scanning said files which exist in the portable executable file format and which also contain a IMAGE_DIRECTORY_ENTRY_TLS structure and accessed for creating the thread data block duplicate with a matching total size.

Figure 3:
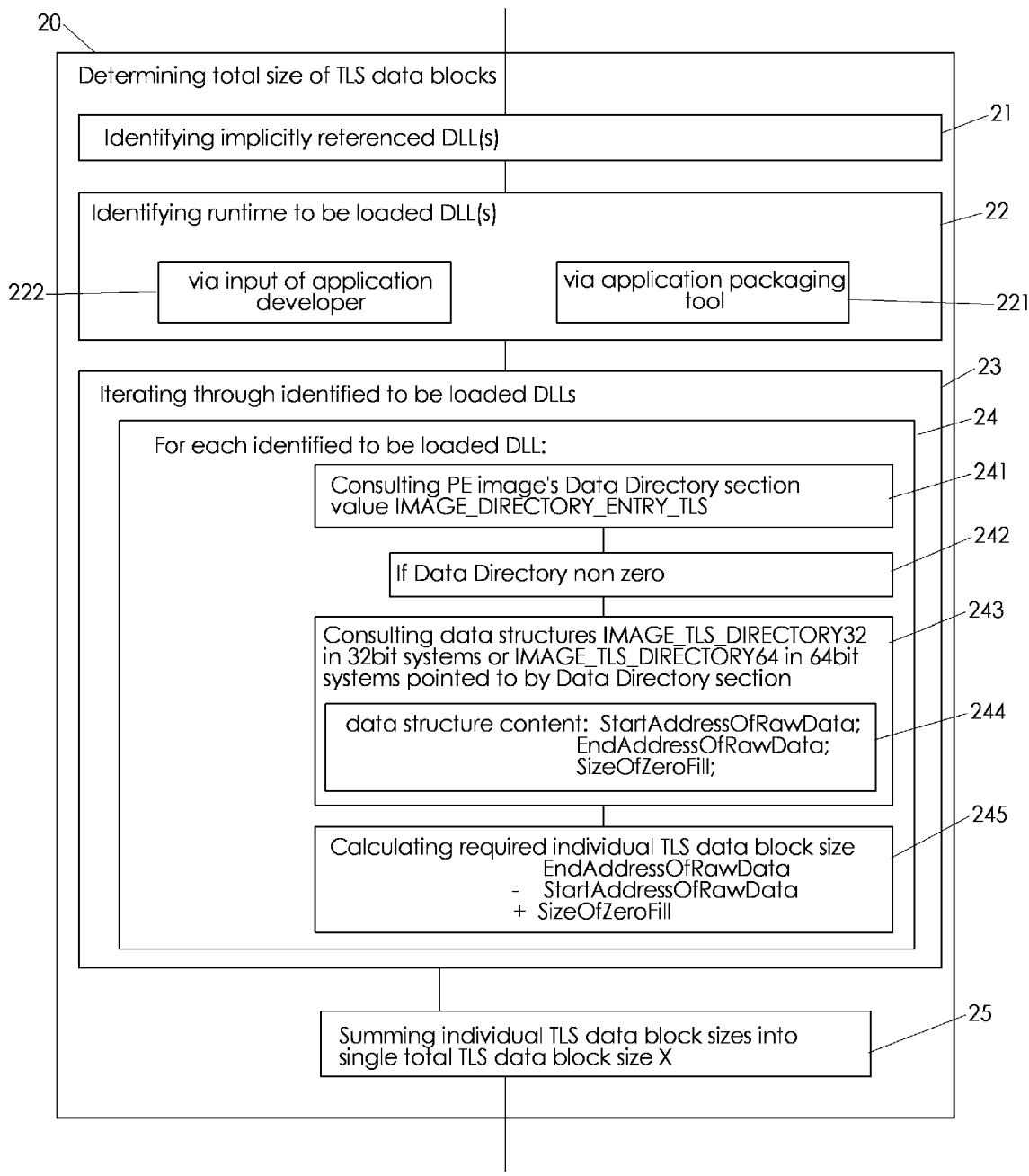
FIG. 3 is a detail block diagram of step 20 depicted in FIG. 2.

Nevertheless and as indicated in step 20 and FIG. 3, the total size X of all relevant static thread local storage may be determined following the initializing of the application execution. In an initial step 21, well known implicitly referenced DLL(s) are identified followed by step 22 of identifying runtime to be loaded DLL(s). As indicated by step 222, runtime to be loaded DLL(s) may be identified via input of an application developer and provided as a set of files associated with a specific application. As indicated by step 221, runtime to be loaded DLL(s) may also be identified via an application packaging tool such as a commercially available product called Thinstall™. Next follows step 23 of iterating through the identified to be loaded DLL(s). For each identified to be loaded DLL of step 24 a required individual thread local storage block size is calculated in a number of steps 241-245 before in step 25 the required individual thread local storage block size(s) are summed up to a total size X of the single thread local storage data block. In step 241, a data directory section of an image of the portable executable software code is consulted. In case of a Windows™ operating system 2, the consulted data directory section may be well known as by the index defined as IMAGE_DIRECTORY_ENTRY_TLS. Next as in step 242 it is determined if that data directory section is non zero.

If the condition of step 242 is met, and in case the operating system 2 is a 32 bit operating system, a well known data structure IMAGE_TLS_DIRECTORY_32 is consulted. In case of a 64 bit operating system 2 and the data directory section is non zero a well known data structure IMAGE_TLS_DIRECTORY_64 is consulted. Both IMAGE_TLS_DIRECTORY_32 and IMAGE_TLS_DIRECTORY_64 may be pointed to by the respective data directory section. This is indicated by step 243.

As in block 244, each of IMAGE_TLS_DIRECTORY_32 and IMAGE_TLS_DIRECTORY_64 contains well known values StartAddressOfRawData, EndAddressOfRawData, and SizeOfZeroFill. Next as illustrated in step 245, the required individual thread local storage data block size is calculated by subtracting StartAddressOfRawData from EndAddressOfRawData and adding SizeOfZeroFill.

Figure 4:
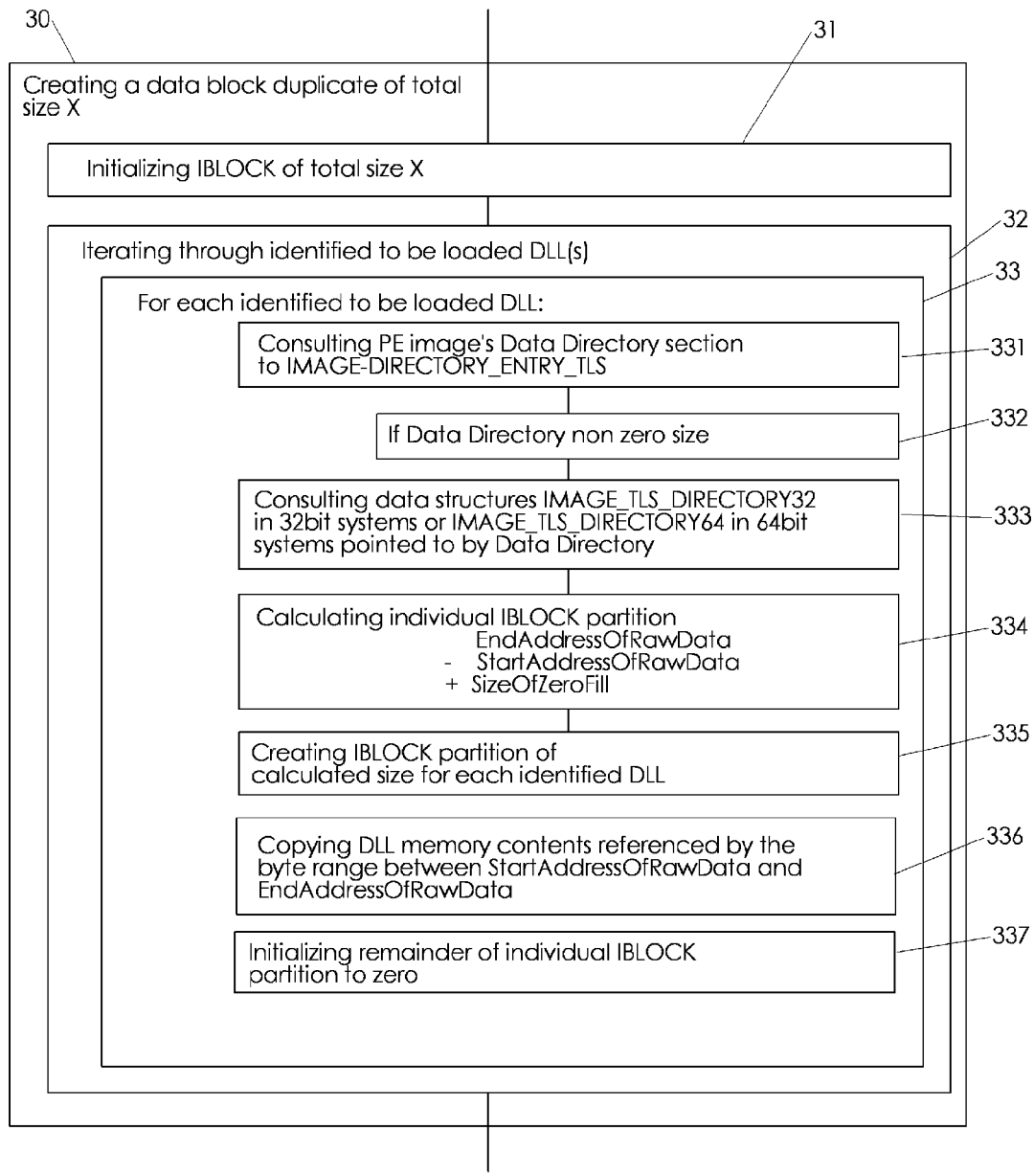
FIG. 4 is a detail block diagram of step 30 depicted in FIG. 2.

Once the total size X is determined, a thread data block duplicate of total size X may be created as in step 30 of FIG. 2 and FIG. 4. In a first step 31, the thread data block duplicate may be initialized for example with a value IBLOCK. In the following step 32 it may be iterated through the identified to be loaded DLL(s). According to step 33 and for each identified to be loaded DLL within a Windows™ operating system a data directory section of an image of the portable executable software code may be consulted to a well known structure IMAGE_DIRECTORY_ENTRY_TLS as shown in step 331 followed by step 332 of determining if the respective data directory section has a data entry that is non zero.

In case the data directory section is non zero and in case the operating system 2 is a 32 bit operating system, a well known data structure IMAGE_TLS_DIRECTORY_32 is consulted. In case of a 64 bit operating system 2 and the data directory section is non zero a well known data structure IMAGE_TLS_DIRECTORY_64 is consulted. Both IMAGE_TLS_DIRECTORY_32 and IMAGE_TLS_DIRECTORY_64 may be pointed to by the respective data directory section. This is indicated by step 333.

Next and as shown in step 334, a partition size of the thread data block duplicate is calculated by subtracting StartAddressOfRawData from EndAddressOfRawData and adding SizeOfZeroFill. In a following step 335, the partition is created with the calculated partition size in a well known fashion and as shown in step 336 a memory contents of the respective to be loaded DLL is copied. The respective memory contents referenced by a byte range between respective StartAddressOfRawData and respective EndAddressOfRawData. Next comes step 337 in which the remainder of the memory size corresponding partition is initialized to zero in a well known fashion.

In case of the first embodiment with a provided thread data block duplicate of previously known total size X, step 31 may be omitted. For each of the noticed to be loaded DLLs a partition corresponding in memory size to a respective one to be loaded DLL may be separated within the thread data block duplicate.

Figure 6:
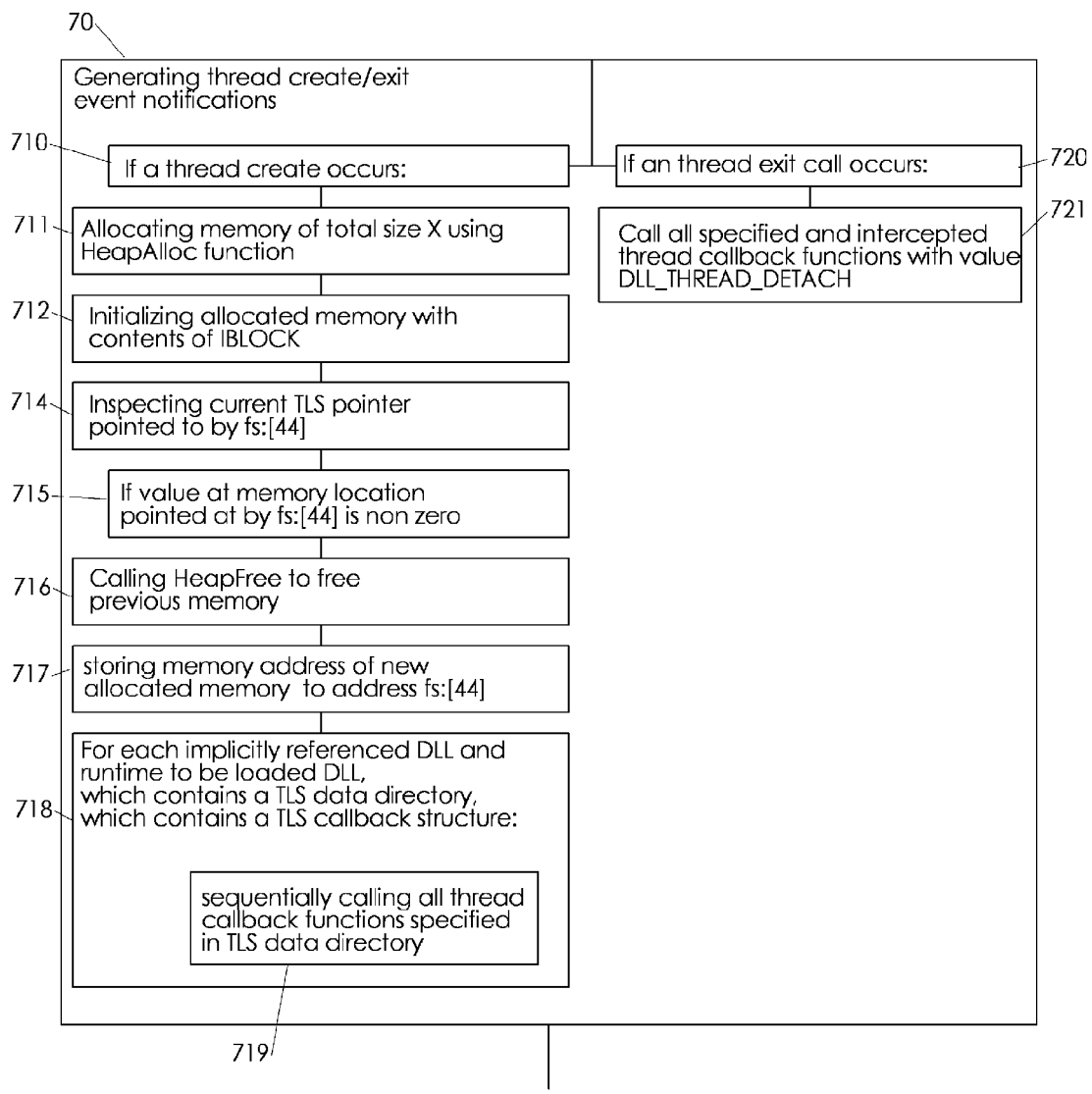
FIG. 6 is a detail block diagram of step 70 depicted in FIGS. 1 and 2.

Again in case of a Windows™ operating system and in case of a third event notification notifying a new thread creation as in step 710 of FIG. 6, steps 711-718 of FIG. 6 take place. As in step 711, memory of the previously calculated total size X is allocated within the isolated process memory area using a well known function HeapAlloc. Next and as in step 712, the allocated memory is initialized with the contents of the thread data block duplicate followed by step 714 of inspecting a current thread local storage pointer pointed to by the CPU memory segment fs, offet 44 (fs:[44]). Fs:44 is used by Windows as a pointer to a thread-specific memory storage block. In case the value at the memory location pointed at by fs:[44] is non zero indicated by step 715, a well known function HeapFree is called in step 716 to free the previous memory. According to step 717, a memory address of the allocated memory is stored to an address of fs:[44].

Then and as shown in step 718 and 719, a number of the thread local storage callback functions are sequentially called for each implicitly referenced DLL(s) and runtime to be loaded DLL(s). The sequentially called thread callback functions are specified in a data directory of the implicitly referenced DLL(s) and/or the runtime to be loaded DLL(s). Also in case of a Windows™ operating system and in case of a fourth event notification notifying a thread exit as in step 720 of FIG. 6, all intercepted thread callback function(s) is/are called with a well known value DLL_THREAD_DETACH.

What is claimed is:

1. A method for runtime emulating static thread local storage of a portable executable software code, said method comprising the steps of:
   a. providing a thread data block duplicate computerized establishable within an isolated process memory area within which said method is practiced, whereby said thread data block duplicate is of predetermined size within said isolated process memory area;
   b. running an application within said isolated process memory area, said application being related to said portable executable software code;
   c. while running said application, running an event notification system generating a first event notification, a second event notification, a third event notification, and a fourth event notification, whereby said first event notification is associated with an intercepted runtime DLL loading, whereby said second event notification is associated with an intercepted runtime DLL freeing, whereby said third event notification is associated with an intercepted runtime thread create call, and whereby said fourth event notification is associated with an intercepted runtime thread exit call, whereby said intercepted runtime DLL loading, said intercepted runtime DLL freeing, said intercepted runtime thread create call and said intercepted runtime thread exit call are made by said application;
   d. upon occurrence of said third event notification, establishing said thread data block duplicate within said isolated process memory area for access by a thread created by said intercepted runtime thread create call; and
   e. upon occurrence of at least one of said first event notification and said second event notification, executing a thread local storage callback function associated with at least one of a loaded DLL and a freed DLL, said loaded DLL being loaded during said intercepted runtime DLL loading, said freed DLL being freed during said intercepted runtime DLL freeing.

2. The method of claim 1, whereby said providing of said step a) is a loading of a predetermined one of said thread data block duplicate from computer storage into said isolated process memory area.

3. The method of claim 2, whereby said thread data block duplicate is configured to provide one or more partitions of predetermined size while said thread data block duplicate is said established within said isolated process memory area.

4. The method of claim 1, whereby said event notification system is a hooking system.

5. The method of claim 1, whereby said event notification system is a debugging system.

6. The method of claim 1, whereby following step b) and prior said step d) is included a step of iterating through a number of to be loaded DLLs noticed via said first event notification, and whereby for each of said noticed number of to be loaded DLLs a memory size corresponding partition is separated within said thread data block duplicate.

7. The method of claim 6 being practiced within an operating system, whereby a step of identifying a runtime to be loaded DLL via at least one of an application developer input and an application packaging tool performed for at least one of said number of to be loaded DLLs includes the following steps of:
   A. consulting a data directory section of an image of said portable executable software code to a structure IMAGE_DIRECTORY_ENTRY_TLS;
   B. determining if said data directory section is non zero;
   C. in case condition of step B) is met consulting at least one of a data structure IMAGE_TLS_DIRECTORY_32 for a 32 bit system and a data structure IMAGE_TLS_DIRECTORY_64 for a 64 bit system, whereby both IMAGE_TLS_DIRECTORY_32 and IMAGE_TLS_DIRECTORY_64 are pointed to by said data directory section, and whereby each of said IMAGE_TLS_DIRECTORY_32 and IMAGE_TLS_DIRECTORY_64 contains values StartAddressOfRawData, EndAddressOfRawData, and SizeOfZeroFill;
   D. calculating a partition size for said memory size corresponding partition by subtracting StartAddressOfRawData from EndAddressOfRawData and adding SizeOfZeroFill;
   E. creating said memory size corresponding partition with said calculated partition size;
   F. copying a memory contents of said at least one of said number of to be loaded DLLs into said memory size corresponding partition, whereby said memory contents is referenced by a byte range between said StartAddressOfRawData and said EndAddressOfRawData; and
   G. initializing a remainder of said memory size corresponding partition to zero.

8. The method of claim 1 being practiced within an operating system, whereby said step c) includes the step of verifying if a loaded DLL noticed via said first event notification matches one of a previously known runtime to be loaded DLL and in case a match is found said step c) further includes the step of consulting a structure IMAGE_TLS_DIRECTORY for a list of said thread local storage callback function, whereby in the case of said first event notification said thread local storage callback function is called with a value DLL_PROCESS_ATTACH, and whereby in case of said second event notification said thread local storage callback function is called with a value DLL_PROCESS_DETACH.

9. The method of claim 1, whereby in the case of said third event notification said thread call back is said called with a value DLL_THREAD_ATTACH, and whereby in the case of said fourth event notification said thread call back is said called with a value DLL_THREAD_DETACH.

10. A method for runtime emulating static thread local storage of a portable executable software code, said method comprising the steps of:
   a. initializing application execution within an isolated process memory area, whereby said application is related to said portable executable software code;
   b. creating a thread data block duplicate within said isolated process memory area, whereby said thread data block duplicate features one or more partitions;
   c. following step a) running said application;
   d. while running said application, running an event notification system generating a first event notification, a second event notification, a third event notification, and a fourth event notification, whereby said first event notification is associated with an intercepted runtime DLL loading, whereby said second event notification is associated with an intercepted runtime DLL freeing, whereby said third event notification is associated with an intercepted runtime thread create call, and whereby said fourth event notification is associated with an intercepted runtime thread exit call, whereby said intercepted runtime DLL loading, said intercepted runtime DLL freeing, said intercepted runtime thread create call and said intercepted runtime thread exit call are made by said application;
   e. upon receipt of said third event notification, allocating said thread data block duplicate for a thread created by said intercepted runtime thread create call; and
   f. and upon receipt of at least one of said first event notification and said second event notification, executing a thread local storage callback function associated with at least one of a loaded DLL and a freed DLL, said loaded DLL being loaded during said intercepted runtime DLL loading, said freed DLL being freed during said intercepted runtime DLL freeing.

11. The method of claim 10, whereby said event notification system is a hooking system.

12. The method of claim 10, whereby said event notification system is a debugging system.

13. The method of claim 10, whereby said step b) includes:
   i. identifying an implicitly referenced DLL implicitly referenced by said application during said initialization of said application execution;
   ii. identifying a runtime to be loaded DLL via at least one of an application developer input and an application packaging tool;
   iii. iterating through a number of said to be loaded DLL identified during step i) and step ii), whereby for each of said number of said to be loaded DLL a required individual thread local storage data block size is calculated; and
   iv. summing a number of said required individual thread local storage data block size to a total size.

14. The method of claim 13 being practiced within an operating system, whereby said required individual thread local storage data block size is said calculated by following steps of:
   A. consulting a data directory section of an image of said portable executable software code, said data directory section being IMAGE_DIRECTORY_ENTRY_TLS;
   B. determining if said data directory section is non zero;
   C. in case condition of step B) is met consulting at least one of a data structure IMAGE_TLS_DIRECTORY_32 for a 32 bit system and a data structure IMAGE_TLS_DIRECTORY_64 for a 64 bit system, whereby both IMAGE_TLS_DIRECTORY_32 and IMAGE_TLS_DIRECTORY_64 are pointed to by said data directory section, and whereby each of said IMAGE_TLS_DIRECTORY_32 and IMAGE_TLS_DIRECTORY_64 contains StartAddressOfRawData, EndAddressOfRawData, and SizeOfZeroFill; and
   D. calculating said required individual thread local storage data block size by subtracting StartAddressOfRawData from EndAddressOfRawData and adding SizeOfZeroFill.

15. The method of claim 13, whereby in the case of said third event notification said step e) further includes the steps of:
   a. allocating memory within said isolated memory area of said total size using a HeapAlloc function;
   b. initializing said allocated memory with contents of said thread data block duplicate;
   c. inspecting a current thread local storage pointer pointed to by an fs:[44];
   d. in case a memory location value pointed at by said fs:[44] is non zero calling a HeapFree function to free a previous memory;
   e. storing a memory address of said allocated memory to an address of said fs:[44]; and
   f. sequentially calling a number of said thread local storage callback function for each of a number of at least one of said implicitly referenced DLL and said runtime to be loaded DLL, whereby at least one of said number of said thread local storage callback function is specified in a data directory in at least one of said implicitly referenced DLL and said runtime to be loaded DLL.

16. The method of claim 10, whereby step c) includes:
   i. initializing said thread data block duplicate; and
   ii. iterating through a number of to be loaded DLLs noticed via said first event notification and for each of said identified number of to be loaded DLLs a corresponding one of said one or more partitions is separated within said thread data block duplicate.

17. The method of claim 16 being practiced within an operating system, whereby said step ii) performed for at least one of said number of to be loaded DLLs includes the following steps of:
   A. consulting a data directory section of an image of said portable executable to IMAGE_DIRECTORY_ENTRY_TLS;
   B. determining if said data directory section is non zero;
   C. in case condition of step B) is met consulting at least one of a data structure IMAGE_TLS_DIRECTORY_32 for a 32 bit system and a data structure IMAGE_TLS_DIRECTORY_64 for a 64 bit system, whereby both IMAGE_TLS_DIRECTORY_32 and IMAGE_TLS_DIRECTORY_64 are pointed to by said data directory section, and whereby each of said IMAGE_TLS_DIRECTORY_32 and IMAGE_TLS_DIRECTORY_64 contains values StartAddressOfRawData, EndAddressOfRawData, and SizeOfZeroFill;
   D. calculating a partition size for one of said one or more partitions by subtracting StartAddressOfRawData from EndAddressOfRawData and adding SizeOfZeroFill;

E. creating said one of said one or more partitions of said calculated partition size;

F. copying a memory contents of said at least one of said number of to be loaded DLLs into said one of said one or more partitions, whereby said memory contents is referenced by a byte range between said StartAddressOfRawData and said EndAddressOfRawData; and G. initializing a remainder of said one of said one or more partitions to zero.

18. The method of claim 10 being practiced within an operating system, whereby said step e) includes the step of verifying if said loaded DLL matches one of a runtime to be loaded DLL identified during step b) and in case a match is found said step e) further includes the step of consulting IMAGE_TLS_DIRECTORY for a list of said thread local storage callback function, whereby in the case of said first event notification said thread local storage callback function is called with a value DLL_PROCESS_ATTACH, and whereby in case of said second event notification said thread local storage callback function is called with a value DLL_PROCESS_DETACH.

19. The method of claim 10, whereby in the case of said third event notification said thread call back is said called with a value DLL_THREAD_ATTACH, and whereby in the case of fourth event notification said thread call back is said called with a value DLL_THREAD_DETACH.

* * * * *